United States Patent Office 3,269,999
Patented August 30, 1966

3,269,999
CORROSION INHIBITORS FROM
AMINE RESIDUE
Howard V. Moore and Norman B. Godfrey, Austin, Tex., assignors to Jefferson Chemical Company, Inc., Houston, Tex., a corporation of Delaware
No Drawing. Filed Feb. 27, 1962, Ser. No. 176,099
11 Claims. (Cl. 260—102)

This application is a continuation-in-part of copending Moore et al. application Serial No. 742,709, filed June 18, 1958, now abandoned, and entitled, "Polyamine Compositions and Method for Preparing Same."

The instant invention relates to condensation products and to their method of preparation. In particular, it relates to condensation products resulting from the reaction of organic acids with certain high-boiling amine residues.

Amine type compounds have been employed, heretofore, as corrosion inhibitors to inhibit the corrosion of ferrous metals brought in contact with various corrosive fluids. In particular, such compounds have been employed to protect the production transfer and storage equipment employed in the petroleum industry. The use of such materials has been limited, however, due to their cost and to the high levels of amine required to provide adequate protection. It has now been discovered that certain novel amine residue-acid condensation products are very effective corrosion inhibitors. These materials are relatively inexpensive and exhibit the ability to maintain good corrosion inhibiting protection at unexpectedly low levels of concentration. These polyamine compositions also have surface active properties and have exhibited the property of stabilizing water-oil emulsions.

In accordance with this invention, a high-boiling amine residue, the preparation of which is described hereinbelow, is reacted with a carboxylic acid at an elevated reaction temperature and an amine to acid equivalent ratio in the range of 0.5:1 to 5:1. This reaction results in the formation of an amine residue-acid condensation product having the properties referred to above.

Thus, the starting materials for the present invention are an organic carboxylic acid and a complex amine residue.

THE COMPLEX AMINE RESIDUE

Production of the complex amine reaction product from which the high-boiling amine components are obtained is accomplished by reacting monoethanolamine with ammonia at an elevated temperature and a superatmospheric pressure in the presence of hydrogen and a hydrogenation catalyst. This reaction may be conducted at a temperature from about 150° to 400° C., but is preferably conducted in the range of 200° to 275° C. The pressure employed may range from about 30 up to about 400 atmospheres.

The molar ratio of ammonia to ethanolamine for this reaction may be in the range of 1:1 to 5:1. Normally, it will be in the order of about 2 to 3 mols of ammonia per mol of monoethanolamine.

Hydrogen is essential for this reaction and should amount to a substantial part of the reaction atmosphere. As a rule, there should be at least 10 and preferably between 20 and 200 atmospheres of hydrogen pressure employed.

The reaction is conducted in the presence of a hydrogenation catalyst. While a large number of hydrogenation catalysts may be employed, the preferred catalyst comprises one or more of the materials selected from the group consisting of the metals and oxides of copper, nickel and cobalt and chromium oxide. Despite the suitability of the oxides, however, it is preferred practice to employ the catalyst in a reduced form. The preferred catalyst may also be employed with a normally nonreducible metal oxide from the group consisting of manganese oxide, molybdenum oxide, thorium oxide and an oxide of the rare earth metals. A specific preferred catalyst composition consists of 75% nickel oxide, 22% copper oxide and 3% chromium oxide.

The crude complex reaction product obtained from the above reaction is subjected to distillation at temperatures up to 150° C. under 50 mm. of mercury pressure absolute, or alternatively, at a temperature above 170° C. under atmospheric pressure. This step effectively removes certain low-boiling materials leaving a high-boiling amine composition as an amine residue, which may amount to upwards of 50% by weight of the crude complex reaction product. The low-boiling materials removed by distillation are not employed in preparing the condenstaion products of the instant invention.

The high-boiling amine composition obtained according to the foregoing method is generally a dark to black-water-soluble material. It has a total amine content determined by HCl titration and stated in meq./g. (milliequivalents/gram) ranging from about 8 to 18. The hydroxyl content in meq./g. ranges from about 5.5 to about 7.0 and the molecular weight (Rast method) ranges from 120 to 140. Also, the primary amine content (Van Slyke), measured in meq./g., will normally be in the range of about 4 to 9, the secondary amine concentration (Sigga), measured in meq./g., will normally be in the range of about 2 to 4 and the tertiary amine concentration (Sigga), measured in meq./g., will normally be within the range of about 4 to 6.

In terms of chemical composition, the high-boiling amine composition will normally contain the components identified in Table I in about the concentration given in the table.

TABLE I.—COMPOSITION OF HIGH-BOILING AMINE RESIDUE

| Compound: | Concentration, wt. percent |
|---|---|
| Diethylenetriamine | 0–2 |
| N-aminoethylpiperazine | 24–34 |
| N-hydroxyethylpiperazine | 10–12 |
| Aminoethylethanolamine | 10–12 |
| Higher homologues of above compounds | 40–50 |

Among the higher homologues that have been identified as present are 1,4-bis-(2-hydroxyethyl) piperazine; 1-(2-hydroxyethyl)-4-(2-aminoethyl) piperazine; 1,1'-ethylenedipiperazine; 1,4-bis(2-aminoethyl) piperazine; and 1-[2-(2-aminoethylamino)ethyl] piperazine.

In one preparation, monoethanolamine and ammonia were reacted in a heated reactor in the presence of a hydrogen atmosphere and in contact with 25 gallons of a nickel-copper-chromia catalyst supported on diatomaceous earth and formed into pellets. The monoethanolamine and ammonia, in a 1:3 mol ratio, were pumped up through the cataylst bed at a rate of 32 gallons of monoethanolamine per hour. The pressure was maintained at 3000 p.s.i.g. (lbs./sq. in. gauge) and the temperature at 240° to 256° C. The crude reaction product, freed of ammonia and hydrogen, was distilled at 50 mm. (millimeters) of mercury pressure absolute at temperatures up to 150° C. The lower boiling materials which were distilled overhead were removed leaving a high-boiling amine residue product amounting to 35.6% of the reaction product.

Atypical high-boiling amine residue obtained by reacting monoethanolamine with ammonia in the manner described above was a black, viscous, water-soluble, oily liquid having an initial boiling point at atmospheric pressure of 202° C., a hydroxyl content in meq./g. (milliequivalents/gram) of 5.8, a total amine content of 16 meq./g. and a molecular weight of about 125 (Rast method). This product is designated for further purposes below as Amine Residue A.

It is within the scope of the present invention to use only a selected portion of the above-identified residue in preparing condensation products. Thus, the whole residue, as above defined, may be "topped" by suitable distillation to provide a shorter residue which will be revealed in the higher molecular components or the whole residue may be fractionated so as to provide a distillate fraction containing a reduced amount of the higher boiling components. This is illustrated by the following.

Modified amine residues may be obtained by subjecting the high-boiling amine residue, exemplified by Amine Residue A, to supplemental treatment or distillation to obtain distinct fractions of the high-boiling amine residue. Thus, Amine Residue A was subjected to distillation to remove about 12.5% of Amine Residue A overhead leaving a residue having desirable properties. This water-soluble residue having a hydroxyl content in meq./g. of 5.0, a total amine equivalent of 15.7 meq./g. and a molecular weight (Rast method) of about 125 is designated Amine Residue B.

Another valuable amine residue product is obtained by subjecting the high-boiling amine residue exemplified by Amine Residue A to flash distillation. Thus, Amine Residue A was subjected to flash distillation to distill about 87% of Amine Residue A overhead. This 97% portion of Amine Residue A flashed overhead is water-soluble, has a hydroxyl content in meq./g. of 6.5, a total amine equivalent of 16.9 meq./g. and a molecular weight (Rast) of about 125 and is designated Amine Residue C.

The above-identified Amine Residue C constitutes a typical example of results obtained by "topping" the whole residue. Thus, for example, the lower boiling 87% of the whole residue will normally have a concentration of components, as further stated in the following Table II.

TABLE II.—HIGHER BOILING 87% OF WHOLE AMINE RESIDUE

| Compound: | Concentration, wt. percent |
|---|---|
| Diethylenetriamine | 0–2 |
| N-aminoethylpiperazine | 40–45 |
| N-hydroxyethylpiperazine | 12–14 |
| Aminoethylethanolamine | 12–14 |
| Higher homologues of above compounds | 25–30 |

The higher homologues of Table II will comprise the higher homologues mentioned above in connection with Table I.

THE ORGANIC ACID COMPONENT

A wide range of organic acids and mixtures thereof may be employed to condense with the above-described high-boiling amine residues to form the products of this invention. These may be represented by the formula $R(COOH)_n$ in which $n$ equals an integer from 1 to 3 and R represents an alkyl, cycloalkyl, alkylene, aryl, alkaryl, aralkyl and alkylidene radical having from 1 to 36 carbon atoms. These acids are characterized as saturated and unsaturated hydrocarbon mono-, di- and polycarboxylic acids.

Typical acids or acid reacting substances which have been employed in condensation reactions with amine residues to produce products which have exhibited valuable properties as inhibitors in corrosion tests include whole and distilled tall oil, tall oil fatty acids, tall oil rosin acids, distilled cotton seed acids and acidulated cotton seed foots, coconut acids, distilled soy bean acids, oleic acid, stearic acid, a mixture of linoleic and oleic acid, oxidized wax, hydrogenated tallow acids, naturally occurring acids and mixtures comprising caprylic, palmitic lauric, caproic, capric, linoleic, myristic and naphthenic acids. Other suitable acids include acetic, propionic, valeric, behenic, arachidic acids, mixed monomer, dimer and trimer acids and dicarboxylic acids, such as azelaic, sebacic, succinic, dilinoleic and isodecenyl succinic acids. The anhydrides of the acids may be employed in place of the acids themselves. In general, the higher fatty carboxylic acids having from 8 to 22 carbon atoms are preferred.

The oxidized waxes are a special class of acid-containing materials. They may be obtained by reacting a de-oiled paraffin wax preferably containing less than about 5 percent oil, in the presence of an oxidation catalyst, preferably $KMnO_4$ with air at an air feed rate of 10 to 50 cubic feet of air/pound of wax/hour at a temperature of 230° to 290° C. and a pressure of 30 to 300 pounds per square inch. These conditions are maintained for an extended period, i.e., for periods ranging up to eight hours or longer until a highly oxidized wax oxidate is produced. Catalysts other than potassium permanganate, such as manganese stearate, manganese naphthenate and zinc stearate may be employed in amounts ranging from 0.01 to 1.0 percent by weight of the wax charge. The oxidized waxes produced by this method will have a neutralization number in the range of 180 to 265, a saponification number in the range of 290 to 410 and a ratio of neutralization number to saponification number of more than 0.6 with the unsaponified matter amounting to less than about 25 percent.

A typical wax oxidate was obtained by charging to an aluminum reactor provided with heat exchange surface 150 pounds of a refined wax obtained by sweating and pressing of unpressed paraffin distillate followed by acid treating and neutralizing, steaming, brightening and filtration through porocel. This wax had the following properties:

| | |
|---|---|
| Flash, O. Cleve., ° F. | 415 |
| Fire, Cleve., ° F. | 460 |
| Visc. Say. Univ. at 210° F. | 37.1 |
| Color, Lov. ½″ cell | 5 |
| English melting point, ° F. | 126.6 |
| Ash, percent | 0.005 |
| Sulfur, percent | 0.07 |
| Oil, percent, ASTM | 0.8 |

There was also charged to the reactor an aqueous solution prepared by dissolving 0.6 pound of potassium permanganate in 10 pounds of water. The reaction mixture was rapidly heated to a temperature of about 340° F. by heat exchange in order to initiate the reaction. After initiation of the reaction was indicated by the evolution of heat, the reaction mass was rapidly cooled to an operating temperature of 270° F. During the induction period the pressure was adjusted to 80 p.s.i.a. and the air rate to 20 standard cubic feet of air per pound of wax per hour. At the end of 4.7 hours the product oxidate had a neut. No. of 195. The yield of oxidate was approximately 97.5 percent of the wax charged; the low molecular weight fractions removed in the exit gases are not included in this yield. The product obtained was characterized by the following tests:

| | |
|---|---|
| Neut. No. | 195 |
| Sap. No. | 312 |
| Unsap. matter | 23.2 |
| Gravity, ° API | 16.7 |
| Flash, O. Cleve., ° F. | 295 |
| Fire, Cleve., ° F. | 330 |
| Visc., Say. Univ. at 210° F. | 59.4 |
| Color, Lov. ½″ cell | 15 |
| Petrolatum melting point, ° F. | 108.8 |
| Ratio, neut. No./sap. No. | 0.63 |

REACTION OF THE AMINE RESIDUE WITH THE CARBOXYLIC ACID

As indicated above, the condensation products of this invention are prepared by reacting an amine residue with an organic acid or acid mixture at an elevated temperature under atmospheric pressure. Higher or lower pressures may be employed but atmospheric pressure is convenient and preferable. The reaction may be conducted at a temperature in the range of 120° to 300° C. although it is preferred to effect condensation at 140° to 190° C. except for rosin acids where the preferred temperature range is 225° to 240° C.

The ratio of amine residue reacted with acid or acid reacting materials may be varied to considerable extent. This ratio, based on the equivalent values of the amine residues and the organic acid or acid mixture has been found satisfactory over the range of 0.5:1 to 5:1 although higher and lower ratios may be employed. Preferred ratios for the reaction are from 1:1 to about 1.5:1.

The reaction between the amine residue and acid or acid-reacting substance is continued for a sufficient length of time to effect substantial condensation between the two reactants. The course of this reaction may be followed by collecting the water of condensation as it is distilled from the reaction product. Generally, the reaction should be continued until at least about 50% of the theoretical amount of water of condensation has been collected overhead.

The reaction product that is formed by this reaction will characteristically contain amino groups and hydroxyl groups, and will also comprise ureido and imidazoline groups. For example, ureido groups will be introduced into the reaction mixture by the condensation of the organic acid with a primary amine group, as illustrated by the following general equation:

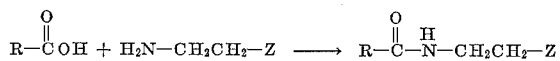

In the above equation, R represents the organic portion of the carboxylic acid and Z represents the terminal portion of a component of the amine residue which may be, for example, an amino alkyl group, a heterocyclic amino group, such as a piperazino group, etc.

As another example, substituted ureido groups and imidazoline groups are introduced into the reaction product, as illustrated by the following general equation:

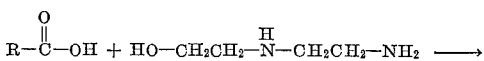

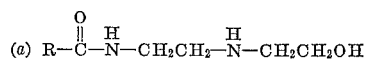

or

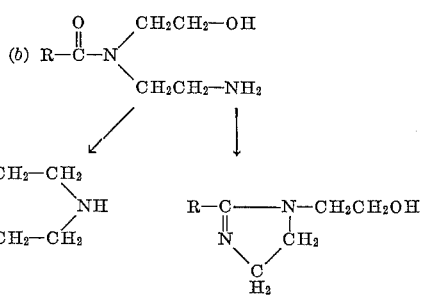

Of course, the ureido type condensation products, the substituted ureido type condensation products and the imidazoline condensation products are further reactive whereby the final condensation product will comprise a wide variety of high molecular weight components of unknown chemical structure.

The condensation products of this invention may be prepared by weighing the desired quantities of reactants into a suitable reaction vessel. As the reactants are initially mixed there results a moderate rise in temperature from about 25° to 85° C. The vessel is then preferably fitted with a thermometer, stirrer and condenser before proceeding further. An external source of heat is applied to raise the temperature of the reactants to 120°–300° C. The reaction may be continued under these conditions anywhere from about 1 to 20 hours or longer, depending on the size of the charge and the course of the reaction as indicated by the volume of water collected overhead.

The following examples illustrate the preparation of the amine residue-acid condensation products of this invention. Solubility in the 1:1 isopropyl alcohol and water solution refers to a clear, homogeneous solution at a 1% concentration of the product.

*Example I*

One hundred twenty-five grams of Amine Residue C and 596 grams of tall oil acids consisting essentially of fatty acids were admixed as described above in a 3-neck reaction vessel. The equivalents ratio of amine to acid was 1:1. The reaction was conducted at 150° to 170° C. for 3.3 hours during which time 28.2 ml. (milliliters) of water were collected overhead. The recovered product (Product A) was insoluble in water, soluble in hot 36–38° API gravity mineral base oil and produced a cloudy solution in a 1:1 solution of isopropyl alcohol and water.

*Example II*

One hundred twenty-five grams of Amine Residue C and 745 grams of tall oil fatty acids were admixed in a 3-neck reaction vessel. On an equivalents basis, this represented an amine to acid ratio of 0.8:1. External heat was applied and the reaction conducted at 155° to 180° C. for 2.5 hours. The recovered amine-acid condensation product, designated as Product B, was insoluble in water, soluble in hot mineral base oil of 36–38° API gravity, and produced a cloudy solution in a 1:1 isopropyl alcohol and water.

*Example III*

One hundred eighty-eight grams of Amine Residue C and 596 grams of tall oil fatty acids were admixed as described in Example I. The equivalents ratio of amine to acid was 1.5:1. The reaction was conducted at 150° to 170° C. for 4.3 hours during which time 33 ml. of water were collected overhead. The recovered product (Product C) was insoluble in water, soluble in hot 36–38° API gravity mineral base oil and was soluble in 1:1 isopropyl alcohol and water.

*Example IV*

Two hundred grams of Amine Residue C and 470 grams of distilled whole tall oil were gradually reacted by adding the acid dropwise to hot amine. The equivalents ratio of amine to acid was 2:1. The reaction was conducted in the range of 150° to 175° C. for 6 hours during which time 15.5 ml. of water were collected overhead. The recovered product (Product D) was a thick paste, soluble in hot 36–38° API gravity mineral base oil and soluble in 1:1 isopropyl alcohol and water.

*Example V*

One hundred grams of Amine Residue C and 432 grams of stearic acid were admixed in a reaction vessel. The equivalents ratio of amine to acid was 1:1. The reaction was conducted at 160° to 180° C. for 1 hour during which time 24 ml. of water were collected overhead. The product, designated Product E, was a hard, solid, insoluble in water, soluble in hot 36–38° API gravity mineral base oil and soluble in 1:1 isopropyl alcohol and water.

*Example VI*

Two hundred grams of Amine Residue C and 451 grams of oleic acid were admixed as described in Example I. The equivalents ratio of amine to acid was 2:1. The reaction was conducted at 160° to 180° C. for a period of 1 hour during which time 28 ml. of water were collected overhead. The recovered product, designated Product F, was a thick paste, soluble in hot 36–38° API gravity mineral base oil and soluble in 1:1 isopropyl alcohol and water.

*Example VII*

One hundred twenty-five grams of Amine Residue C and 410 grams of coconut acids were admixed as described above. The equivalents ratio of amine to acid was 1:1. The reaction was conducted at 160° to 180° C. for 1.5 hours during which time 30 ml. of water was collected overhead. The recovered product (Product G) was a waxy material, soluble in hot 36–38° API gravity mineral base oil and soluble in 1:1 isopropyl alcohol and water.

*Example VIII*

Two hundred grams of Amine Residue A and 374 grams of distilled whole tall oil were admixed as described above. The equivalents ratio of amine to acid was 2.7:1. The reaction was conducted at 150° to 170° C. for 3 hours during which time 15 ml. of water was collected overhead. The product, Product H, was a viscous material, soluble in hot 36–38° API gravity mineral base oil.

The novel amine residue-acid condensation products of this invention, as noted above, were unexpectedly found to possess valuable properties as corrosion inhibitors. Accordingly, these materials were tested to evaluate their corrosion inhibiting properties under standardized conditions.

The corrosion tests were conducted in 4 ounce polyethylene bottles fitted with polyethylene caps. Simulated corrosion conditions were effected by preparing a treated mixture of brine and oil for the bottles. Ninety ml. (milliliters) of brine solution, which was prepared from sodium chloride, calcium chloride and distilled water were added to each bottle. The brine contained 10% sodium chloride and 0.5% calcium chloride by weight. Ten milliliters of a 36–38° API gravity oil from a mineral base crude source were also added to the polyethylene bottles. This mixture was then saturated for 5 minutes with hydrogen sulfide in order to produce a simulated sour brine. The $H_2S$ gas was introduced through a fritted glass dispersion tube of medium porosity. After saturation with $H_2S$, 1 ml. of 6% aqueous acetic acid and a clean weighed coupon were added and the system closed for testing. In those instances in which the effectiveness of an inhibitor was to be determined, the inhibitor was added to the oil-brine mixture prior to saturation with the hydrogen sulfide gas and the addition of the acetic acid and metal coupon. Where used, the inhibitor was always added to give a predetermined level of inhibitor concentration specified in p.p.m. (parts per million) of the oil-brine mixture.

The corrosiveness of the system was determined by its effect on coupons prepared from mild steel bar-stock ⅛″ thick and ½″ wide. Coupons were carefully machined from the bar-stock to a smooth finish, the final dimensions being about ⅛″ by ½″ by 2″. These were stored under oil prior to use and were thoroughly washed with 5 separate portions of petroleum ether followed by drying and weighing at the time of use.

The corrosion tests were conducted in a corrosion test oven designed to maintain a constant temperature and to rotate the test bottles containing the coupon and simulated brine solution at a constant speed. The bottles were mounted on a 2 foot diameter disk which rotated at a constant 2 revolutions per minute during the test. The temperature of the oven was set at 120±2° F. These conditions were maintained for a 69 to 72 hour exposure period. At the end of the test period, the coupons were removed from the bottles, thoroughly washed, dried and weighed.

The value of the various corrosion inhibitors was determined by observing the physical appearance and by comparing the weight losses of the coupons from the inhibited test solutions to the appearance and weight losses of coupons exposed to similar but uninhibited sour brine solutions. The physical appearances of the coupons were rated bright, smooth, spotty, uneven, etched or pitted in the order of increasingly severe evidence of corrosion. Bright stands for little if any detectable attack and smooth indicates a detectable but uniform attack. Spotty indicates a very shallow localized attack and uneven indicates a mild localized attack. Etched indicates severe uniform attack and pitted a severe localized attack. All of the tests were conducted in duplicate. The effectiveness of the products produced according to the foregoing examples is shown in Table III below:

TABLE III.—CORROSION IN SOUR BRINE

| Products | Concentration, p.p.m. | Coupon Weight Loss, mg. | Coupon Appearance | Percent Corrosion Inhibition |
|---|---|---|---|---|
| Blank | | 178 | Pitted | |
| A | 100 | 1.5 | Bright | 98.5 |
| B | 100 | 3 | Spotty to Bright | 98 |
| C | 100 | 3.5 | Spotty | 97.5 |
| Blank | | 195 | Pitted | |
| D | 100 | 5 | Speckled to Bright | 96.5 |
| E | 25 | 2 | Bright | 98 |
| Blank | | 150 | Pitted | |
| F | 100 | 3 | Bright | 98 |
| G | 100 | 2.5 | Bright | 98.5 |
| H | 100 | 3 | Spotty | 98 |

In comparison, a commercially available inhibitor was tested under the same conditions at a concentration of 100 p.p.m. The test coupons were pitted and had an average weight loss of 70 milligrams. This inhibitor, inhibited corrosion to the extent of only 58%.

The following examples illustrate corrosion inhibiting condensates prepared according to this invention in which various amine residues have been employed.

*Example IX*

Two hundred grams of Amine Residue A and 563 grams of whole tall oil were admixed as described above. The equivalents ratio of amine to acid was 2:1. The reaction was conducted at 150° to 160° C. for 3 hours during which time 16 ml. of water were collected overhead. The product was a very viscous material soluble in hot 36–38° API gravity mineral base oil. Under corrosion test conditions similar to those described above at 100 p.p.m. concentration, this material was effective to inhibit corrosion by 76%.

*Example X*

One hundred eighty-seven grams of Amine Residue B and 880 grams of whole tall oil were admixed as described above. The equivalents ratio of amine to acid was 1:1. The reaction was conducted at 155° to 165° C. for 6.5 hours during which time 30 ml. of water representing 72% of the theoretical water was recovered overhead. The product was a black tarry material. Under test a concentration of 50 p.p.m. this material had the property of inhibiting corrosion to the extent of 97%.

Example XI

Seventy grams of Amine Residue C and 384 grams of tall oil rosin acids were admixed as described in Example I. The equivalents ratio of amine to acid was 1:1. The reaction was conducted at 150° to 215° C. for 20.5 hours during which time 12 ml. of water, representing 60% of the theoretical water was collected overhead. The product was a hard solid. Under test at a concentration of 25 p.p.m. this material had the property of inhibiting corrosion to the extent of 72%.

Additional compositions were prepared and tested as shown in Table II. The amine residue and acid were reacted in the proportion shown in a flask at a temperature from about 160° to 185° C. for about 1.6 hours and the water produced collected overhead. The corrosion tests were conducted in the manner described above.

TABLE IV.—CORROSION INHIBITOR TEST DATA

| | Components of Composition | | Amine to Acid Ratio | Concentration of Inhibitor in p.p.m. | Average Coupon Wt. Losses in Milligrams in Sour Fluids |
|---|---|---|---|---|---|
| | Amine Residue | Acid | | | |
| 1 | | | | (¹) | 160 |
| 2 | B | Crude Tall Oil | 1:1 | 50 | 5 |
| 3 | A | Distilled Tall Oil | 2:1 | 50 | 2 |
| 4 | C | ----do---- | 2:1 | 50 | 4 |
| 5 | C | Tall Oil Fatty Acids | 2:1 | 50 | 3 |
| 6 | C | ----do---- | 1:1 | 20 | 2 |
| 7 | C | ----do---- | 0.8:1 | 25 | 4 |
| 8 | C | Distilled Coconut Acids | 1:1 | 25 | 2 |
| 9 | A | ----do---- | 1:1 | 50 | 1 |
| 10 | C | Acidulated Cotton Seed Foots | 1:1 | 25 | 2 |
| 11 | C | Oleic Acid | 2:1 | 100 | 3 |
| 12 | C | Mixed Caprylic, 94%, caproic and capric acids. | 1:1 | 25 | 2 |
| 13 | A | Oxidized Wax | 1:1 | 20 | 3 |
| 14 | C | Stearic Acid | 3:1 | 25 | 4 |
| 15 | C | Distilled Coconut Acids | 1:1 | 10 | 3 |

¹ None (control).

As seen from the results set forth in Table IV, the compositions of the present invention provide good inhibition at concentrations within the range of about 10 to about 100 p.p.m.

CORROSION INHIBITION

The amine residue-carboxylic acid reaction products of the present invention are unexpectedly effective in inhibiting the corrosion of ferrous metal surfaces, as evidenced by the above specific examples. Thus, the reaction products of the present invention are particularly suitable for preventing corrosion of oil well producing equipment in concentrations within the range of about 10 to about 500 p.p.m. based on the corrosive fluid. Of course, larger amounts may be employed, if desired.

In a typical treating operation, a corrosion inhibiting amount of condensation product of the present invention is incorporated into a corrosive fluid, such as a sour petroliferous well fluid and the resultant mixture is brought into contact with a ferrous metal surface to be protected whereby corrosion of the ferrous metal surface is significantly inhibited. As a specific example, in a situation where a corrosive petroliferous fluid was being produced from a subsurface formation through a production tubing extending from the surface of the ground to a point in the producing well, a portion of the produced well fluid may be mixed with a condensation product of the present invention to provide a desired concentration of the condensation product and the resultant mixture may be circulated through the well producing equipment by standard methods (e.g., by introducing said mixture into the annulus between the production tubing and the outside of the well for circulation down the bore hole and for recirculation up the tubing, together with the newly produced petroliferous fluid).

Obviously, many modifications and variations of the invention as hereinbefore set forth may be made without departing from the spirit and scope thereof, and therefore, only such limitations should be imposed as are indicated in the appended claims.

What is claimed is:

1. A method for preparing a polyamine composition which comprises reacting an amine residue defined herebelow with an aliphatic hydrocarbyl carboxylic acid at a temperature in the range of 120° to 130° C. to form an amine residue-acid condensation product, said amine residue being obtained by reacting monoethanolamine with ammonia at a temperature in the range of 150° to 400° C. and a pressure of 30 to 400 atmospheres in the presence of hydrogen and a hydrogenation catalyst selected from the group consisting of the metals and oxides of copper, nickel and cobalt and chromium oxide to form a reaction product and subjecting said reaction product to distillation at about 150° C. under 50 mm. of mercury pressure absolute to remove the low-boiling products and recover a high-boiling amine composition as said amine residue.

2. A method for preparing a polyamine composition which comprises reacting an amine residue with an aliphatic hydrocarbyl carboxylic acid at an effective temperature above about 120° C. to about 300° C. to form an amine residue-acid condensation product, said amine residue being obtained by reacting monoenthanolamine with ammonia at a temperature in the range of 150° to 400° C. and a pressure of 30 to 400 atmospheres in the presence of hydrogen and a hydrogenation catalyst selected from the group consisting of the metals and oxides of copper, nickel and cobalt and chromium oxide, the mol ratio of said ammonia to said monoethanolamine being in the range of 1:1 to 5:1 to form an amine reaction product and subjecting said reaction product to distillation at about 150° C. under 50 mm. of mercury pressure absolute to remove the low-boiling amine products and recover a high-boiling amine composition as said amine residue.

3. A process according to claim 2 in which the mol ratio of said ammonia to said monoethanolamine is in the range of 2:1 to 4:1.

4. A process according to claim 3 in which said high-boiling amine composition is subjected to distillation to distill about 12.5% of said composition overhead and leave a refined amine product as said amine residue.

5. A process according to claim 3 in which said high-boiling amine composition is subjected to flash distillation to distill about 87% of said high-boiling amine composition overhead thereby producing a flashed amine product overhead as said amine residue.

6. A method for preparing a polyamine composition which comprises reacting an amine residue with a hydrocarbyl carboxylic acid, selected from the group consisting of fatty acids, tall oil acids, rosin acids, cotton seed acids, coconut acids, soy bean acids, tallow acids and oxidized wax acids, the equivalents ratio of said amine residue to said acid being between 0.5:1 and 5:1 at a temperature in the range of 120° to 300° C. to form an amine residue-acid condensation product, said amine residue being obtained by reacting monoethanolamine with ammonia at a temperature in the range of 150° to 400° C. and a pressure of 30 to 400 atmospheres in the presence of hydrogen and a hydrogenation catalyst selected from the group consisting of the metals and oxides of copper, nickel and cobalt and chromium oxide, the mol ratio of said ammonia to said monoethanolamine being in the range of 1:1 and 5:1, to form an amine reaction product, subjecting said amine reaction product to distillation at a temperature up to about 150° C. under 50 mm. of mercury pressure absolute to remove the lower-boiling amine products and recover a high-boiling amine composition as said amine residue.

7. A method for preparing a polyamine composition which comprises reacting an amine residue with a hydrocarbyl carboxylic acid, selected from the group consisting of fatty acids, tall oil acids, rosin acids, cotton seed acids, coconut acids, soy bean acids, tallow acids and oxidized wax acids, the equivalents ratio of said amine residue to said acid being between 1:1 and 1.5:1, at a temperature in the range of 140° to 190° C. until at least about 50% of the theoretical water of condensation has been distilled overhead to form an amine residue-acid condensation product, said amine residue being obtained by reacting monoethanolamine with ammonia at a temperature in the range of 200° to 275° C. and a pressure of 30 to 400 atmospheres in the presence of hydrogen and a hydrogenation catalyst selected from the group consisting of the metals and oxides of copper, nickel and cobalt and chromium oxide, the mol ratio of said ammonia to said monoethanolamine being in the range of 1:1 to 5:1, to form a wide-boiling amine reaction product, subjecting said amine reaction product to distillation at a temperature up to about 150° C. under 50 mm. of mercury pressure absolute to remove the lower-boiling amine products and recover a high-boiling amine composition as said amine residue.

8. A polyamine composition produced by reacting an amine residue defined hereinbelow with a hydrocarbyl carboxylic acid, selected from the group consisting of fatty acids, tall oil acids, rosin acids, cotton seed acids, coconut acids, soy bean acids, tallow acids and oxidized wax acids, at a temperature in the range of 120° to 300° C., to form an amine residue-acid condensation product, said amine residue being obtained by reacting monoethanolamine with ammonia at a temperature in the range of 150° to 400° C. and a pressure of 30 to 400 atmospheres in the presence of hydrogen and hydrogenation catalyst selected from the group consisting of the metals and oxides of copper, nickel and cobalt and chromium oxide, the mol ratio of said ammonia to said compound being in the range of 1:1 and 5:1, to form an amine reaction product and subjecting said amine reaction product to distillation at about 150° C. under 50 mm. of mercury pressure absolute to remove the low-boiling amine products and recover a high-boiling amine composition as said amine residue.

9. A polyamine composition produced according to claim 8 in which said high-boiling amine composition is subjected to distillation to distill about 12.5% of said composition overhead and leave a refined amine product as said amine residue.

10. A polyamine composition produced according to claim 8 in which said high-boiling amine composition is subjected to flash distillation to distill about 87% of said high-boiling amine composition overhead thereby producing a flashed amine product overhead as said amine residue.

11. A polyamine composition produced by reacting an amine residue with a hydrocarbyl carboxylic acid, selected from the group consisting of fatty acids, tall oil acids, rosin acids, cotton seed acids, coconut acids, soy bean acids, tallow acids and oxidized wax acids, the equivalents ratio of said amine residue to said acid being in the range of 0.5:1 and 5:1, at a temperature in the range of 120° to 300° C. under atmospheric pressure until at least about 50% of the water of condensation has been distilled overhead to form an amine residue-acid condensation product, said amine residue being obtained by reacting monoethanolamine with ammonia at a temperature in the range of 150° to 400° C. and a pressure of 30 to 400 atmospheres in the presence of hydrogen and a hydrogenation catalyst selected from the group consisting of the metals and oxides of copper, nickel and cobalt and chromium oxide, the mol ratio of said ammonia to said monoethanolamine being in the range of 1:1 and 5:1 to form an amine reaction product, subjecting said amine reaction product to distillation at a temperature up to about 150° C. under 50 mm. of mercury pressure absolute to remove the lower-boiling amine products and recover a high-boiling amine composition, and subjecting said high-boiling amine composition to flash distillation to distill about 87% of said high-boiling amine composition overhead thereby producing a flashed amine product overhead as said amine residue.

References Cited by the Examiner

UNITED STATES PATENTS

| | | | |
|---|---|---|---|
| 2,598,213 | 5/1952 | Blair. | |
| 2,861,995 | 11/1958 | MacKenzie | 260—268 |
| 2,910,477 | 10/1959 | Long | 260—268 |
| 2,923,696 | 2/1960 | Harwell | 260—585 X |
| 2,941,943 | 6/1960 | Kirkpatrick | 260—97.5 X |

LEON J. BERCOVITZ, *Primary Examiner.*

DONALD E. CZAJA, LEON ZITVER, *Examiners.*

F. McKELVEY, D. P. CLARKE, *Assistant Examiners.*